United States Patent
Velagapudi et al.

(10) Patent No.: US 9,298,712 B2
(45) Date of Patent: Mar. 29, 2016

(54) CONTENT AND OBJECT METADATA BASED SEARCH IN E-READER ENVIRONMENT

(71) Applicant: Microsoft Corporation, Redmond, WA (US)

(72) Inventors: Suresh Velagapudi, Bellevue, WA (US);
Raman Narayanan, Seattle, WA (US);
Ming Liu, Bellevue, WA (US);
Radoslav Nickolov, Seattle, WA (US);
Wei Zeng, Sammamish, WA (US);
Aleksandr Gil, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 189 days.

(21) Appl. No.: 13/713,465

(22) Filed: Dec. 13, 2012

(65) Prior Publication Data
US 2014/0172825 A1    Jun. 19, 2014

(51) Int. Cl.
*G06F 17/30*    (2006.01)
(52) U.S. Cl.
CPC ...... *G06F 17/30023* (2013.01); *G06F 17/3002* (2013.01); *G06F 17/3005* (2013.01); *G06F 17/30265* (2013.01); *G06F 17/30967* (2013.01)
(58) Field of Classification Search
CPC ................................................. G06F 17/30265
USPC .................................................. 707/705, 706
See application file for complete search history.

(56) References Cited

U.S. PATENT DOCUMENTS

| 7,200,597 | B1 | 4/2007 | Grizzard |
| 7,304,635 | B2 | 12/2007 | Seet et al. |
| 7,433,893 | B2 | 10/2008 | Lowry |
| 7,502,785 | B2 * | 3/2009 | Chen et al. |
| 7,624,130 | B2 * | 11/2009 | Chen et al. |
| 7,634,471 | B2 * | 12/2009 | Chen et al. |
| 7,716,224 | B2 | 5/2010 | Reztlaff et al. |
| 7,974,974 | B2 | 7/2011 | Tankovich et al. |
| 2004/0135815 | A1 | 7/2004 | Browne et al. |
| 2006/0173824 | A1 * | 8/2006 | Bensky et al. ............ 707/3 |
| 2007/0136683 | A1 * | 6/2007 | Heidari et al. ............ 715/792 |

(Continued)

FOREIGN PATENT DOCUMENTS

WO    2011/017557 A1    2/2011

OTHER PUBLICATIONS

Shen, et al., "eBooks in the Cloud: Desirable Features and Current Challenges for a Cloud-based Academic eBook Infrastructure", Retrieved at <<http://elpub.scix.net/data/works/att/113_elpub2011.content.pdf>>, In the proceedings of 15th International Conference on Electronic Publishing, Jun. 22, 2011, pp. 7.

(Continued)

*Primary Examiner* — Baoquoc To
(74) *Attorney, Agent, or Firm* — Jessica Meyers; Jim Ross; Micky Minhas (57) ABSTRACT

Metadata based enhanced search capabilities are provided in conjunction with e-reader experience. Metadata associated with content and objects within displayed content is created based on default and/or custom rules. The metadata such as attributes, tags, etc. is indexed and used to augment search queries based on selected portions of the displayed content. Additional search augmentation is performed based on user-defined metadata or processing of objects such as image recognition of image objects and similar processes.

17 Claims, 7 Drawing Sheets

(56) References Cited

U.S. PATENT DOCUMENTS

| | | | |
|---|---|---|---|
| 2007/0239697 A1* | 10/2007 | Chen et al. | 707/4 |
| 2007/0239712 A1* | 10/2007 | Chen et al. | 707/6 |
| 2007/0239792 A1* | 10/2007 | Chen et al. | 707/200 |
| 2008/0082497 A1* | 4/2008 | Leblang et al. | 707/3 |
| 2008/0243788 A1 | 10/2008 | Reztlaff et al. | |
| 2008/0281958 A1* | 11/2008 | McKinnon et al. | 709/224 |
| 2009/0157661 A1 | 6/2009 | Carullo et al. | |
| 2011/0052074 A1* | 3/2011 | Hayaishi | 382/190 |
| 2011/0261030 A1 | 10/2011 | Bullock | |
| 2012/0151351 A1 | 6/2012 | Kilroy et al. | |
| 2012/0197981 A1* | 8/2012 | Chan | 709/203 |
| 2013/0282729 A1* | 10/2013 | Fisher | 707/741 |

OTHER PUBLICATIONS

"International Search Report & Written Opinion for PCT Patent Application No. PCT/US2013/075165", Mailed Date: Jul. 29, 2014, Filed Date: Dec. 13, 2013, 10 Pages.

* cited by examiner

CONTENT AND OBJECT METADATA BASED SEARCH IN E-READER ENVIRONMENT

BACKGROUND

Mobile computing has transformed media consumption across markets. Miniaturization across product generations has enabled more functionality to be accomplished by smaller devices. A modern smartphone has more computing capacity than a desktop computer a few years ago. Mature product processes have also enabled advances in technology to be integrated to automated production of mobile devices seamlessly. Extensive automation has led to inexpensive components. Inexpensive components have enabled manufacturing of inexpensive mobile devices providing functionality on the go.

Recently, content has been making an accelerated march towards digital. Professionally published books and magazines are the most recent segment moving to digital domain with a variety of reader devices and platforms offering different aspects of user experience. As increased variety of content is provided through e-readers and users desire enhanced interaction capabilities, conventional search features fail to satisfy the demand for an enhanced e-reader experience. Users looking for a specific location within the provided content may not remember a string or object to search for. They may have a fuzzy memory of a location (e.g. a graph of interest rates, video on muscle motion), which may degrade the experience in regard to search capabilities.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing metadata based enhanced search capabilities in conjunction with e-reader experience. Metadata associated with content and objects within displayed content may be created based on default and/or custom rules. The metadata such as attributes, tags, etc. may be indexed and used to augment search queries based on selected portions of the displayed content. Additional search augmentation may be performed based on user-defined metadata or processing of objects such as image recognition of image objects and similar processes.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a search query may be generated based on user action or automatically based on selection of one or more words. The query may be augmented based on automatically detected or user-defined metadata associated with objects within the displayed content.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing metadata based search in an e-reader application. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

Figure 1:
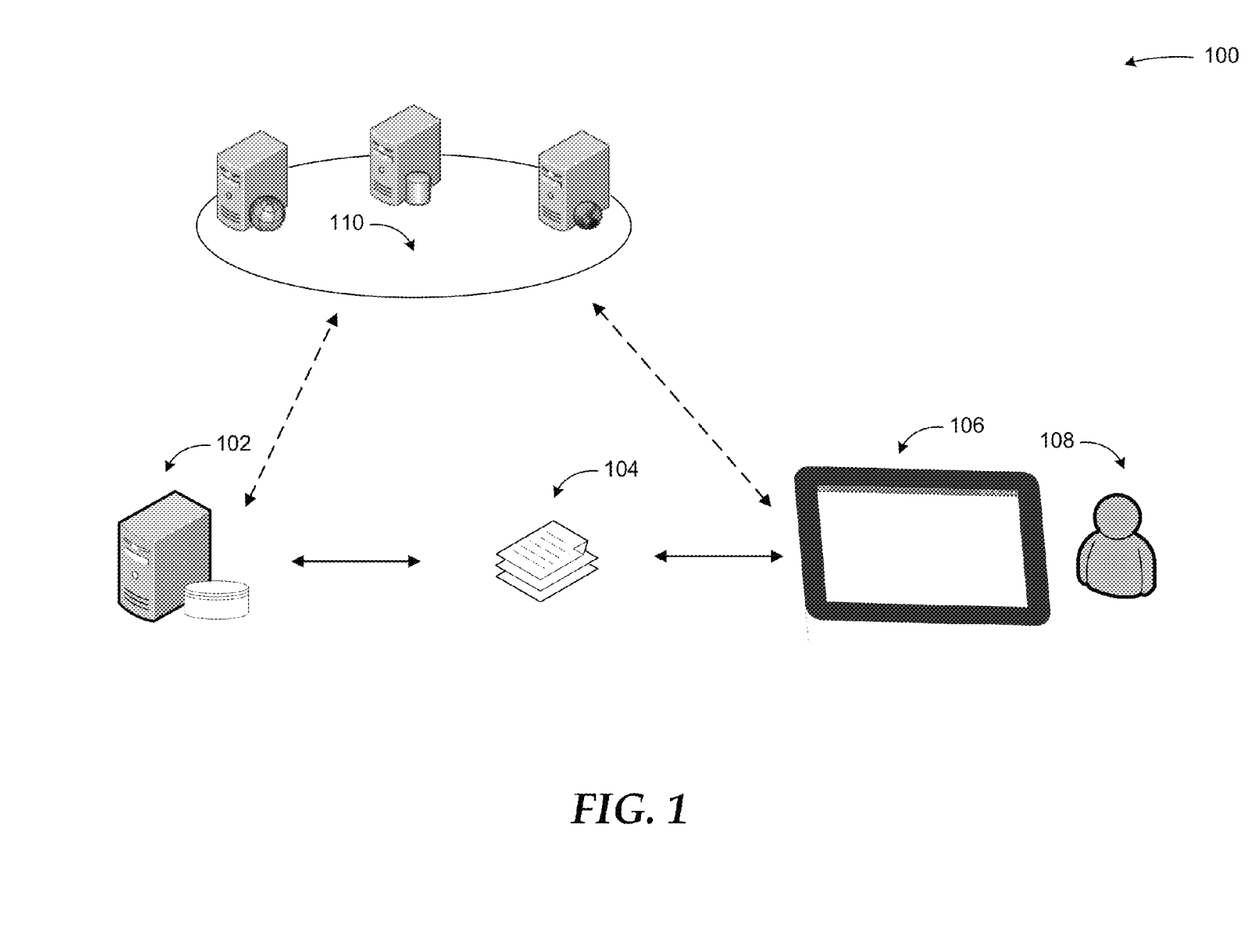
FIG. 1 illustrates an example architectural diagram of providing metadata based search in e-readers according to some embodiments.

FIG. 1 illustrates an example architectural diagram of providing metadata based search in e-readers according to some embodiments. The components and environments shown in diagram 100 are for illustration purposes. Embodiments may be implemented in various local, networked, cloud-based and similar computing environments employing a variety of computing devices and systems, hardware and software.

An "e-reader" device such as a tablet 106 may host an application providing content 104 to a user 108. Such an application may be called an e-reader application, which may be a locally installed and executed application receiving content (e.g., e-books, documents, etc.) through wired or wireless networks. The e-reader application may also be a hosted service provided by one or more servers and accessed by a user through the e-reader device (e.g., tablet 106). Content 104 may be any type of consumable data including but not exclusive to text, audio, video, graphic, etc. Content 104 may also include media combinations presented in a standardized format (i.e.: a web page.) Content 104 may be provided by a content server 102 hosting the content for consumption by services and devices.

An e-reader application according to embodiments may present content such as an e-book, a magazine article, a newspaper, or even a personal document to user 108 through tablet device 106 and enable enrichment of user experience through searches. Upon detecting a direct user action (e.g., activation of a search control following selection of a portion of displayed content) or automatically upon selection of a portion of the content, the e-reader application may submit a query to one or more search resources 110 (e.g., search engines, databases, etc.). The query may be augmented with metadata information based on the objects within the displayed content such that more focused and relevant search results can be provided to the user. The metadata may be generated based on default and/or custom rules. The metadata may also be user defined.

Embodiments are not limited to implementation in a tablet 106. In addition to touch or gesture enabled interactions, other input mechanisms such as standard mouse and keyboard interface, gyroscopic input devices, eye-tracking, and similar inputs may also be employed.

Figure 2:
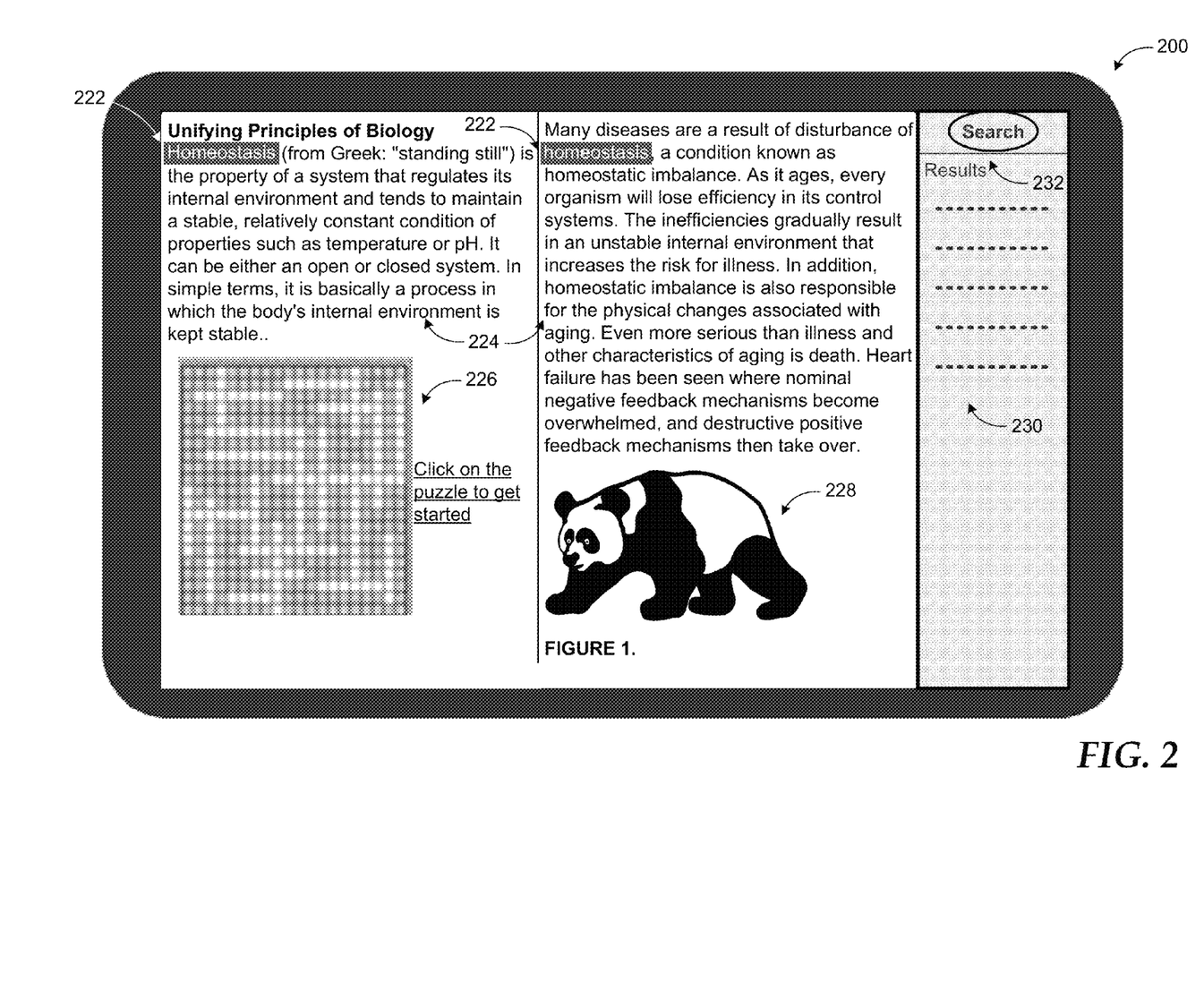
FIG. 2 illustrates an example of metadata based search in an e-reader application according to embodiments.

FIG. 2 illustrates an example of metadata based search in an e-reader application according to embodiments. Diagram 200 displays user interface of an e-reader application presenting textual content with interactive objects and a search pane presenting search results for a selected portion of the textual content.

In the example scenario of diagram 200, the displayed content is from an interactive textbook. The textbook presented information on unifying principles of biology discussing homeostasis. The displayed content includes textual portions 224, graphics 228, and an interactive puzzle object 226 to provide enhanced reading experience to a user. In a system according to embodiments, context based search capabilities within the e-reader may be further enhanced by providing search capability based on metadata associated with content and objects within the content. Metadata may be created for various objects within the content such as graphics 228 and/or puzzle object 226 based on default/custom rules. For example, image dimensions, image types, image titles, etc. associated with the graphics 228 may be indexed along with other search items. Other examples may include tags associated with objects, type and/or duration of audio/video recordings. Images may also be processed with optical character recognition or similar technique and recognized textual content of images (or key terms derived thereof) may be indexed as well.

A user may select a portion of the textual content, for example, the word "homeostasis" 222 and activate a search by activating the search control 232. In some embodiments, the search may be activated automatically upon detection of the selection of the word "homeostasis" 222. Search results may be presented in a search pane 230. To provide the user with a more focused and relevant search experience, an e-reader application according to embodiments may index the metadata and augment a search query with the indexed metadata.

Figure 3:
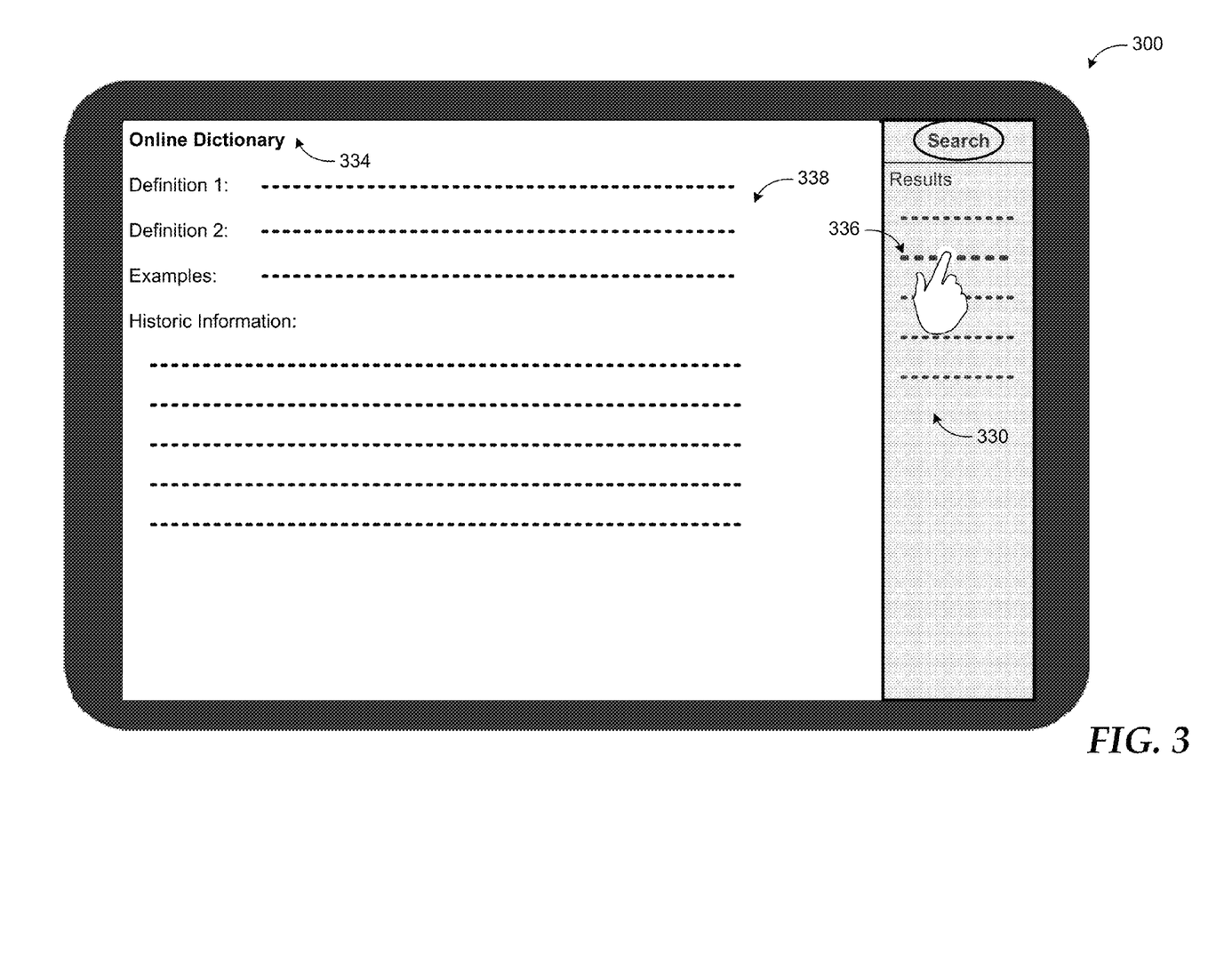
FIG. 3 illustrates an example of presenting summary and detailed search results for a metadata based search in an e-reader application according to embodiments.

FIG. 3 illustrates an example of presenting summary and detailed search results for a metadata based search in an e-reader application according to embodiments. Content of interest may be searched with results being shown within the reading experience. For example, content of an e-book may be searched in a library (of user's books and other content associated with the e-reader application) and user notes along with a web search during the look-up process. For example, a selected word may be searched online and/or through user's domain based on the context of content around that word. Results may be provided in categories such as images, maps, text, scholarly articles, and similar groups based on the context and/or user preferences. Diagram 300 displays an example presentation of search results.

As shown in the diagram, a summary of search results, for example categorized based on the metadata may be presented in the search results pane 330. The results may be textual, but may also be augmented with graphics and/or images. Upon selection of one of the search results 336 in the search results pane 330, details of that result may be displayed in place of the original content in the main view pane.

Upon selection of one of the results listed in the results pane 330, more search results 338 and more information associated with each item may be displayed under the source's name (334) in the main viewing pane. According to some embodiments, a search user interface may provide a user the option of selecting among default metadata or defining their own metadata. Search among the content associated with the e-reader may then be performed by augmenting the search query with the indexed metadata.

Figure 4:
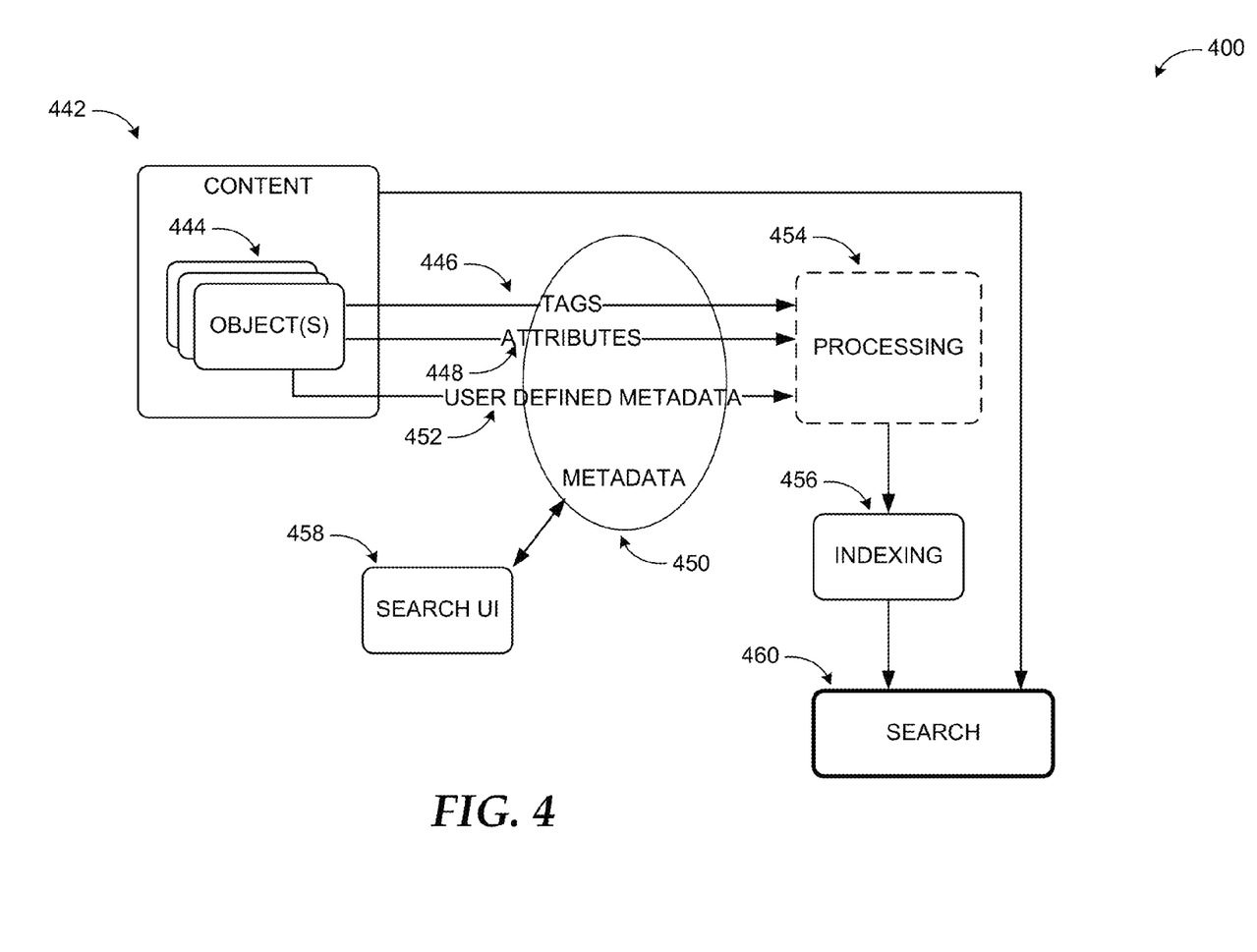
FIG. 4 illustrates conceptually augmentation of a search based on object metadata in an e-reader environment according to embodiments.

FIG. 4 illustrates conceptually augmentation of a search based on object metadata in an e-reader environment according to embodiments. Conventional searches may have shortcoming when a user looking for a specific location does not remember a string to search for or has a fuzzy memory of the location. In a system according to some examples, a search index backend may identify and ingest metadata on various objects in the presented content based on the content structure (e.g. HTML tag, dimensions, type, etc.) including recognition of text in an image through optical character recognition. The additional data may be used in returning the result set for the search query.

Diagram 400 shows content 442 with multiple objects 444. Each object may be associated with metadata 450 such as object type, dimensions, and if the object is interactive, interactivity features (e.g., an API definition, data source for the object, etc.). The metadata 450 may include attributes 448 and tags 446, for example. The metadata 450 may also include user defined metadata 452. A user may be enabled to provide the user defined metadata 452 and/or select among tags 446 and attributes 448 through a search user interface 458. The metadata may be subjected to processing 454, for example, derivation of key terms through optical character recognition. The metadata may then be indexed (456) by the e-reader application (or a hosted service) and used to augment a search query generated based on selected portions of the content 442 at a search module 460.

The example scenarios and configurations in FIG. 1 through 4 are shown with specific objects, data types, and configurations. Embodiments are not limited to systems according to these example configurations. Providing content and object metadata based search in e-reader environment may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
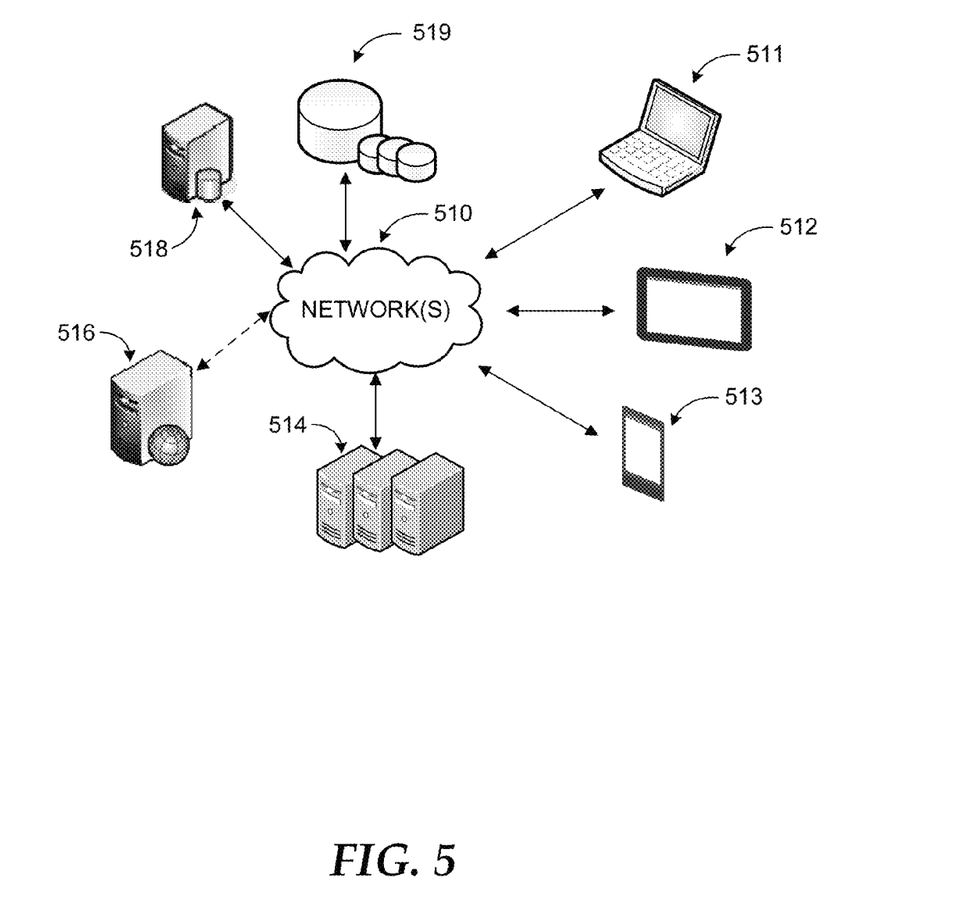
FIG. 5 is a networked environment, where a system according to embodiments may be implemented.

FIG. 5 is a networked environment, where a system according to embodiments may be implemented. Local and remote resources may be provided by one or more servers 514 or a single server (e.g. web server) 516 such as a hosted service. An e-reader application may execute on individual computing devices such as a smart phone 513, a tablet device 512, or a laptop computer 511 ('client devices') and communicate with a content resource through network(s) 510.

As discussed above, an e-reader application may provide metadata based search in an e-reader environment. Indexed metadata information associated with objects in a vicinity of the searched content may be used to augment a search query and results may be prioritized, categorized, and/or presented based on based on default parameters, user preferences, and/or content type. Client devices 511-513 may enable access to applications executed on remote server(s) (e.g. one of servers 515) as discussed previously. The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to providing content and object metadata based search in e-reader environment. Furthermore, the networked environments discussed in FIG. 5 are for illustration purposes only. Embodiments are not limited to the example applications, modules, or processes.

Figure 6:
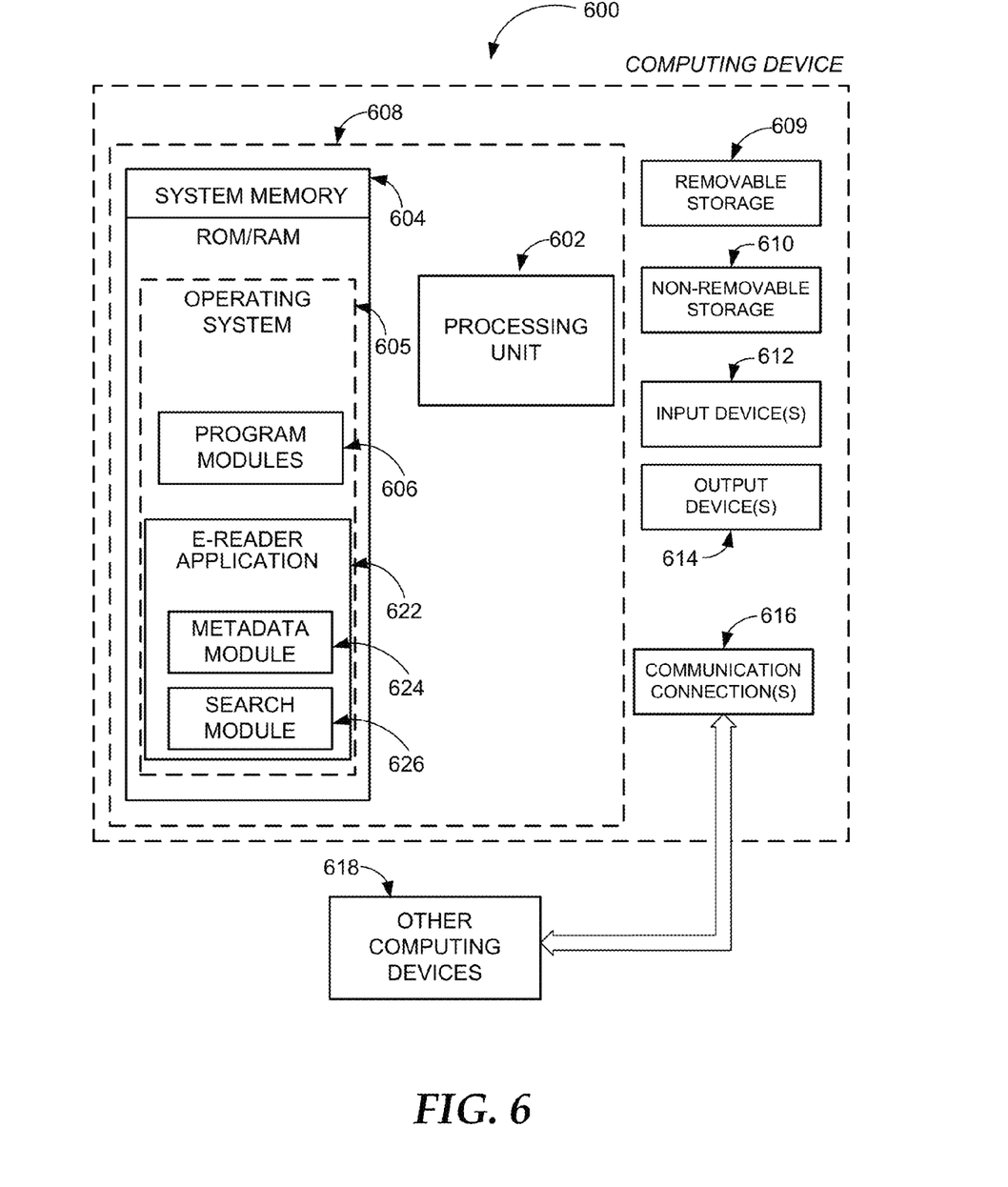
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® and WINDOWS PHONE® operating systems from MICROSOFT CORPORATION of Redmond, Wash. The system memory 604 may also include one or more software applications such as program modules 606, an e-reader application 622, a metadata module 624, and a search module 626.

The e-reader application 622 may submit a query such as a list of words that may or may not include particular phrases or other query semantics to a search engine through the search module 626 based on user action or automatically based on selection of one or more words. The query may be augmented based on indexed metadata information of objects within the content. The metadata may be retrieved by the metadata module 624 or user defined. In some examples, the metadata module 624 and/or the search module 626 may be separate modules/applications of integrated parts of the e-reader application 622. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. Computer readable storage media is a computer readable memory device. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
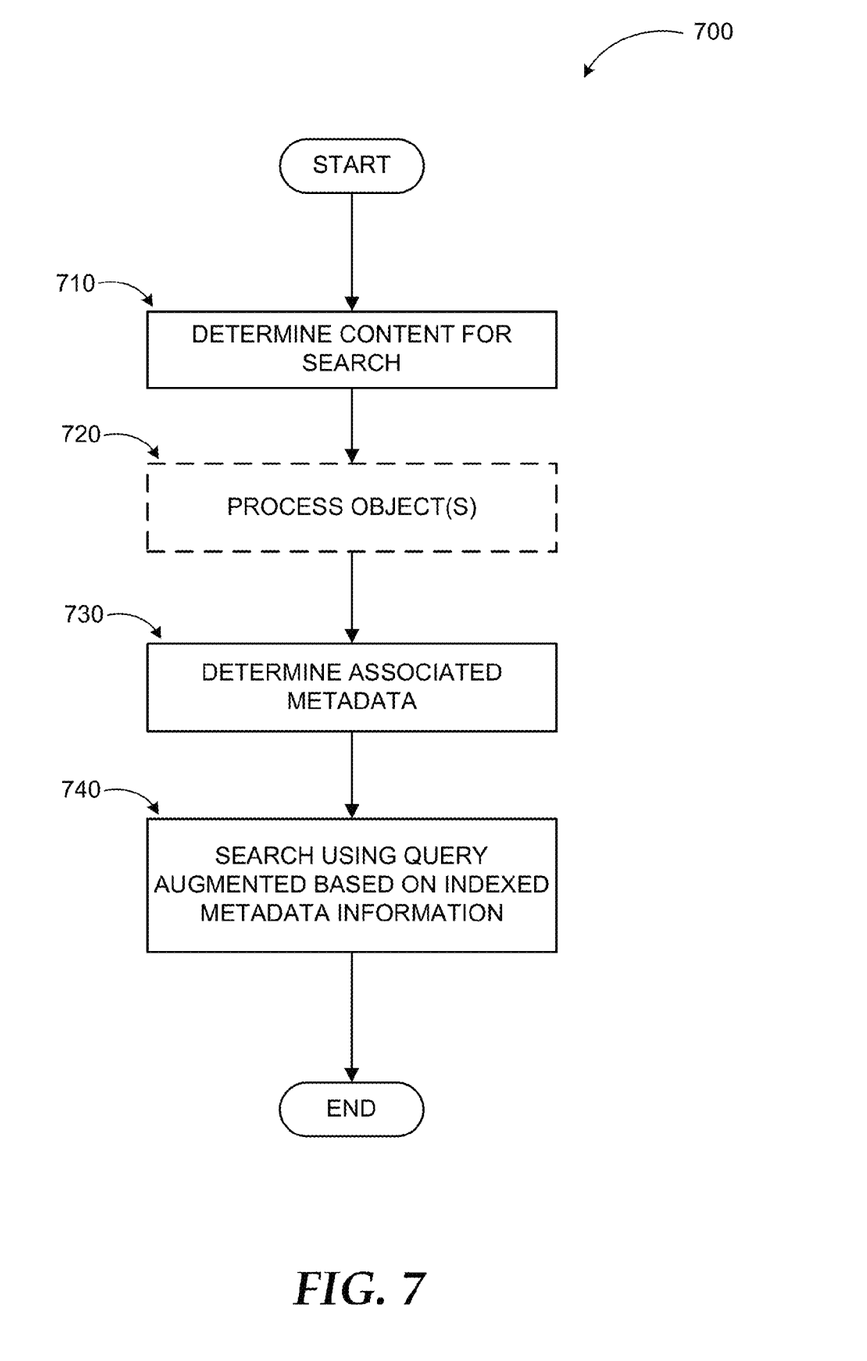
FIG. 7 illustrates a logic flow diagram for a process of providing metadata based search in an e-reader application according to embodiments.

FIG. 7 illustrates a logic flow diagram for a process of providing metadata based search in an e-reader application according to embodiments. Process 700 may be implemented by an e-reader application in some examples.

Process 700 may begin with operation 710 where the e-reader application may determine content for search based on detecting selection of a portion of displayed content for search purposes. The search may be initiated automatically upon selection or by direct user action such as activation of a search control. At optional operation 720, the application may process one or more objects that may provide context to the search. For example, images in a vicinity of the selected content may be recognized and key terms derived to be used to augment a search query.

At operation 730, metadata associated with the selected content portion such as images, other textual portions, graphics, interactive objects, etc. may be determined. The metadata may be created automatically based on default or custom rules. The metadata may also be user defined. At operation 740, the search may be performed based on the search query augmented by indexed metadata information providing relevant, enhanced, and focused results. The search may be executed in one or more of web resources, a user library associated with an e-reader application, a collection of user documents, and/or a collection of user notes generated through the e-reader application.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 700 are for illustration purposes. Providing metadata based search in an e-reader application, according to embodiments, may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide a metadata based search in an e-reader environment, the method comprising:
   determining search terms based on a selected portion of displayed content;
   generating a query for a search based on the selected portion;
   determining the metadata associated with one or more objects associated with the search terms, wherein the one or more objects include embedded images, embedded graphical objects, and one or more interactive objects, interactive puzzle objects, embedded video objects, and embedded audio objects;
   performing optical character recognition on each of the embedded images and the embedded graphical objects to retrieve textual content and key terms from each of the embedded images and the embedded graphical objects;
   indexing the metadata, wherein the metadata includes the textual content and the key terms;
   augmenting the query based on the metadata, wherein the metadata is associated with one or more attributes of each of the one or more objects;
   categorizing a summary of query results based on the metadata; and
   presenting the summary of the query results in a results pane on a user interface.

2. The method of claim 1, further comprising:
   determining the metadata associated with the one or more objects within a predefined vicinity of the selected portion.

3. The method of claim 1, wherein the one or more attributes include one or more of a dimension of the one or more objects, a type of the one or more objects, and a title of the one or more objects.

4. The method of claim 1, further comprising:
   determining the metadata from one or more tags associated with each of the one or more objects.

5. The method of claim 4, wherein the metadata includes one or more of a type of each of the one or more objects a type of each of the embedded audio objects, a title of each of the embedded audio objects, a title of each of the embedded video objects, a duration of each of the embedded audio objects, and a duration of each of the embedded video objects.

6. The method of claim 1, further comprising:
   processing the one or more objects to retrieve the metadata.

7. The method of claim 1, further comprising:
   retrieving the key terms from the embedded audio objects and the embedded video objects.

8. The method of claim 1, further comprising:
   generating the query in response to detecting activation of a search control following the selection of the portion of the displayed content.

9. A computing device to provide a metadata based search in an e-reader environment, the computing device comprising:
   a memory configured to store instructions; and
   a processor coupled to the memory, the processor executing an e-reader application in conjunction with the instructions stored in the memory, wherein the e-reader application is configured to:
   determine search terms based on a selected portion of displayed content;
   generate a query for a search based on the selected portion;
   determine the metadata associated with one or more objects, wherein the one or more objects include embedded images, embedded graphical objects, and one or more interactive objects, interactive puzzle objects, embedded video objects, and embedded audio objects;

perform optical character recognition on each of the embedded images and the embedded graphical objects to retrieve textual content and key terms from each of the embedded images and the embedded graphical objects;

index the metadata, wherein the metadata includes the textual content and the key terms;

augment the query based on the metadata, wherein the metadata is associated with one or more attributes of each of the one or more objects and includes at least one from a set of dimensions, types, titles, and tags of the one or more objects;

categorize a summary of query results based on the metadata; and present the summary of the query results in a results pane on a user interface.

10. The computing device of claim 9, wherein the metadata is created for the one or more objects based on one or more of a default rule and a custom rule.

11. The computing device of claim 9, wherein the metadata is user-defined metadata provided through a search user interface managed by the e-reader application.

12. The computing device of claim 9, wherein the e-reader application is further configured to:

enable interaction for a user through one or more of a touch input, a gesture input, a mouse input, a keyboard input, a gyroscopic input, and an eye-tracking input.

13. The computing device of claim 9, wherein the e-reader application is one of a locally executed application and a client application accessing an e-reader service.

14. A method executed on a computing device to provide a metadata based search in an e-reader environment, the method comprising:

determining search terms based on a selected portion of displayed content;

generating a query for a search based on the selected portion;

determining the metadata associated with one or more objects within a predefined vicinity of the selected portion by processing the one or more objects to retrieve metadata, wherein the one or more objects include embedded images, embedded graphical objects, and one or more interactive objects, interactive puzzle objects, embedded video objects, and embedded audio objects, and wherein the interactive objects are associated with the search terms;

performing optical character recognition on each of the embedded images and the embedded graphical objects to retrieve textual content and key terms from each of the embedded images and the embedded graphical objects;

indexing the metadata, wherein the metadata includes the textual content and the key terms;

augmenting the query based on the metadata, wherein the metadata is associated with one or more attributes of each of the one or more objects and includes at least one from a set of dimensions, types, titles, and tags of the one or more objects;

categorizing a summary of query results based on the metadata; and presenting the summary of the query results in a results pane on a user interface.

15. The method of claim 14, further comprising:

generating the query in response to detecting one of the selection of the portion of the displayed content and activation of a search control following the selection of the portion of the displayed content.

16. The method of claim 14, further comprising:

categorizing search results of the query based on the metadata.

17. The method of claim 14, further comprising:

enabling execution of the search in one or more of web resources, a user library associated with an e-reader application, a collection of user documents, and a collection of user notes generated through the e-reader application.

* * * * *